United States Patent [19]

Kagaya

[11] 4,105,157
[45] Aug. 8, 1978

[54] PROGRAM READING APPARATUS

[75] Inventor: Yutaka Kagaya, Kodaira, Japan

[73] Assignee: Silver Seiko Ltd., Kodaira, Japan

[21] Appl. No.: 821,811

[22] Filed: Aug. 4, 1977

[30] Foreign Application Priority Data

Aug. 17, 1976 [JP] Japan .............................. 51-109373[U]

[51] Int. Cl.² .................... G06K 13/00; D04B 15/66; D03D 49/00; G06K 7/10
[52] U.S. Cl. ................................ 235/475; 66/154 R; 139/317; 235/458
[58] Field of Search ............... 235/454, 458, 475, 476, 235/477; 197/64, 65, 66; 66/154 R, 154 A, 155, 156; 139/317, 319, 332

[56] References Cited

U.S. PATENT DOCUMENTS

| | | | |
|---|---|---|---|
| 2,872,013 | 2/1959 | Wittwer | 197/66 |
| 3,760,188 | 9/1973 | Plath | 139/319 |

*Primary Examiner*—Daryl W. Cook
*Attorney, Agent, or Firm*—Lane, Aitken, Dunner & Ziems

[57] ABSTRACT

A program reading apparatus in a knitting machine including a movable reading head adapted to scan a program carrier having thereon patterning instructions for control of the pattern to be knitted on the machine. Means are provided therein for preventing rebound of the reading head upon arrival at or return to its starting position, such means being operated by the momentum of the reading head upon reading head arrival or return to momentarily arrest the reading head at the starting position.

13 Claims, 5 Drawing Figures

PROGRAM READING APPARATUS

BACKGROUND OF THE INVENTION

This invention relates to a program reading apparatus for reading a program on a program carrier, which has a movable reading head adapted to scan the program carrier on the apparatus.

In a knitting machine having an electromechanical patterning mechnism, a program reading apparatus is provided for reading design instructions on a design paper or program carrier to produce electric signals for controlling the patterning mechanism. A program reading apparatus, especially for a home knitting machine, may be constructed, for economy, such that it includes a single movable reading head adapted to scan the program carrier along a predetermined scanning line and which is intermittently fed, step by step, transversely to the scanning line on the apparatus. Such a program reading apparatus is disclosed in U.S. Patent Application Ser. No. 737,433, titled "Knitting Machine Coupled With The Program Reading Device", filed on Nov. 1, 1976, now U.S. Pat. No. 4,085,597.

In order to attain high mechanical speed capability and response in scanning, a program reading apparatus preferably employs an electric linear motor for moving the reading head along the scanning path. The reading head is usually initially positioned at its starting position at one end of the scanning path to read an instruction specially provided on a predetermined portion of the program carrier appropriately positioned relative to the starting position for the head. The control circuit controlling the linear motor then causes the reading head to move from the starting position to the other stroke end of the scanning path and thereafter, to return to the starting position. Upon each arrival of the reading head to the starting position. Upon each arrival of the reading head to the starting position, however, the reading head in a conventional machine may be rebounded, thereby moving to a position in which it begins to read design instructions within the design region of the program carrier. Subsequent starting of scanning movement of the reading head from such position will, inevitably, cause misreading of such design instructions on the program carrier along the scanning line, thereby resulting in improper operation of the knitting machine.

To ensure proper positioning of the reading head at the correct starting position at the beginning of each scan, the control circuit may be implemented to energize the linear motor to urge the reading head to the starting position for an additional period of time sufficient for the head to become stationary after it has first arrived at or returned to the starting position. Such an implementation, however, is disadvantageous in that a relatively long period of time is thereby required for a complete scan cycle because of such additional required period of time. As a result, the rapidity with which a scanning cycle may be effected is considerably impaired.

SUMMARY OF THE INVENTION

Accordingly, an object of the present invention is to provide a program reading apparatus having a new and efficient device for preventing rebound of the movable reading head upon its arrival at its starting position.

Another object of the invention is to provide a program reading apparatus wherein the movable reading head is momentarily arrested upon return to its starting position in preparation for a subsequent scanning movement with minimum period of delay.

Still another object of the invention is to provide a program reading apparatus having a movable reading head having a greatly improved mechanical speed capability and response during scanning.

A program reading apparatus according to the present invention comprises an arrester member which is movable to an inoperative position in which it is clear of the reading head and also movable to an operative position in which it cooperates with the reading head to prevent movement of the reading head either to or from the starting position for the reading head. The arrester member may be momentarily brought into the operative position in response to an arrival or return of the reading head to its starting position, thereby momentarily arresting the reading head at the starting position. The reading head is then immediately released from the arrester member in preparation for the next scanning movement.

Further features and advantages of the present invention will be apparent from the following description of the preferred embodiment with reference to the accompanying drawings.

DESCRIPTION OF THE PREFERRED EMBODIMENT

Figure 1:
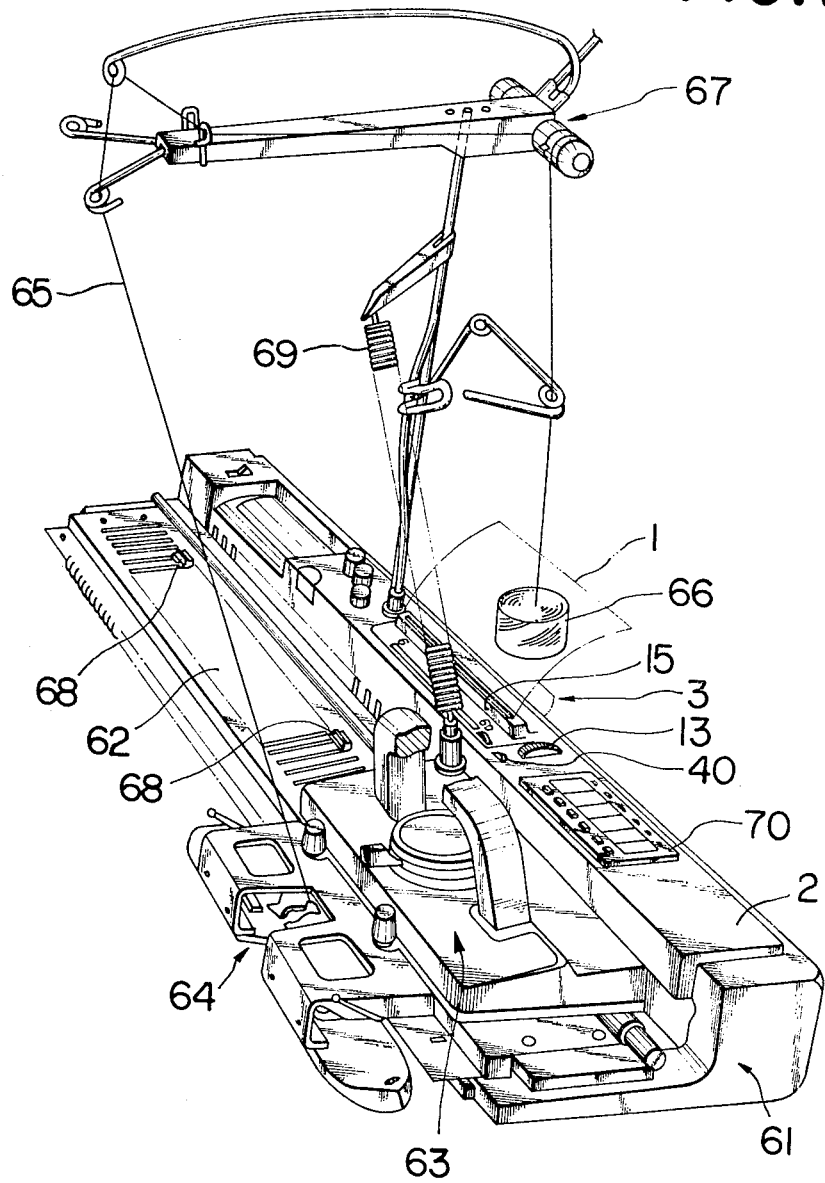
FIG. 1 is a perspective view of a hand-operated knitting machine having a program reading apparatus according to the invention.

The knitting machine in FIG. 1 comprises a machine body 61 having thereon a needle bed 62 in which a plurality of movable knitting needles are mounted in the needle bed 62 in a side by side relation. A manually operable carriage 63 is slidably mounted on the needle bed 62 for operation of the knitting needles. The carriage 63 is provided with a yarn feeder 64 for laying or feeding a knitting yarn or yarns 65 onto the knitting needles during knitting operation. The knitting yarns 65 are supplied from yarn supplies 66 through a conventional takeup device 67 removably mounted on the machine body 61 and having takeup springs.

The carriage 63 is provided with a pair of needle selecting means (not shown) each of which comprises an electromechanical actuator means operable by a common drive circuit means for selectively operating the knitting needles. The carriage 63 is further provided with means for detecting the movement of the carriage relative to the needle bed. The detecting means includes, for example, a carriage timing pulse generator, a carriage running direction detecting switch mechanism, etc., and a switch mechanism cooperating with a pair of actuator members 68. The positions selected by the operator for the actuator members 68 on the needle bed 62 defines a range in which the needle selection operation is to be effected by the needle selecting means as disclosed in U.S. patent application Ser. No. 737,433.

The detecting means and electromechanical actuators are electrically connected by means of a flexible multi-wire cable 69 to the common drive circuit means which is provided under a cover 2 mounted on the machine body 61. The cover 2 has thereon an integral control board 70 provided with several manually operable members in the form of keys or push buttons as input means to the circuit means and with corresponding display devices as output means from the circuit means.

The machine body 61 is provided with a reading device generally designated by 3. The reading device 3 is adapted to read the program or patterning instructions recorded on a program carrier 1 and to provide electric signals representative of the patterning instructions to the drive circuit means. The drive circuit means in turn provides drive signals to the electromechanical actuators in response to movement of the carriage 63 for selective energization for needle selection in correspondence with the signals provided by the reading device 3.

Figure 2:
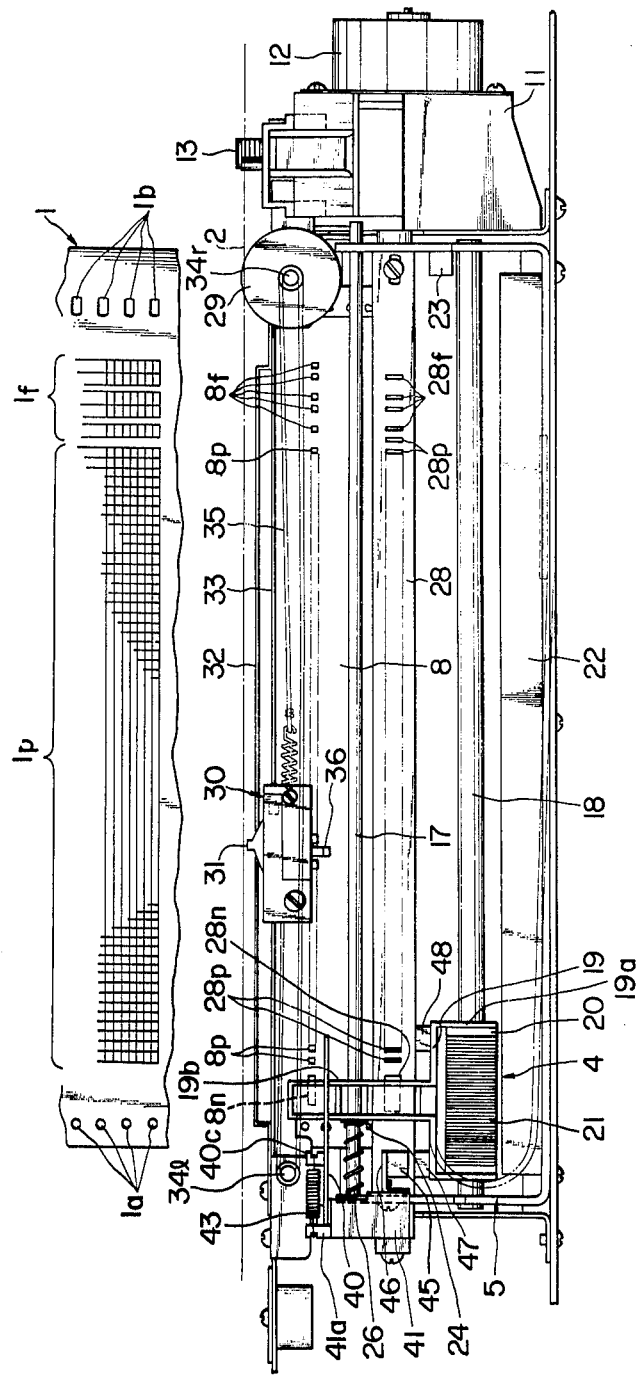
FIG. 2 is an elevational view showing in detail a program reading apparatus according to the invention.
Figure 3:
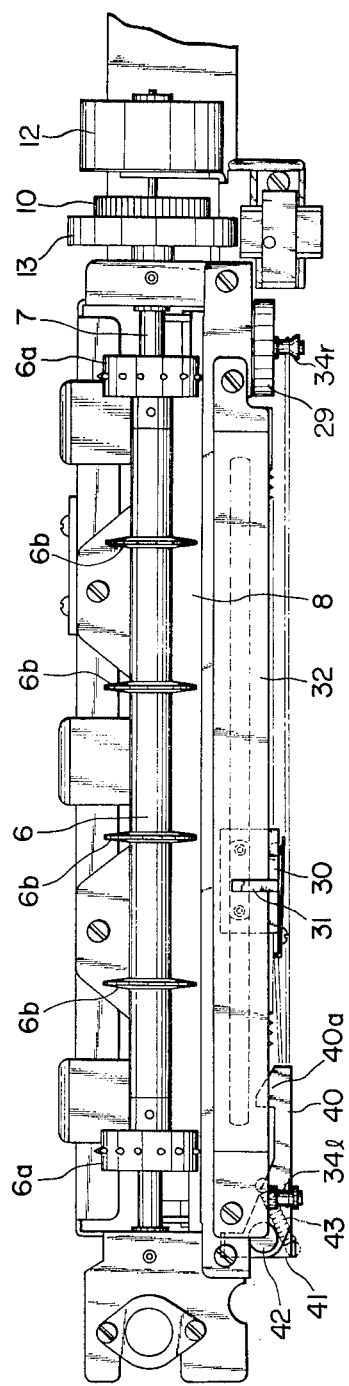
FIG. 3 is a plan view of the reading apparatus of FIG. 2.
Figure 4:
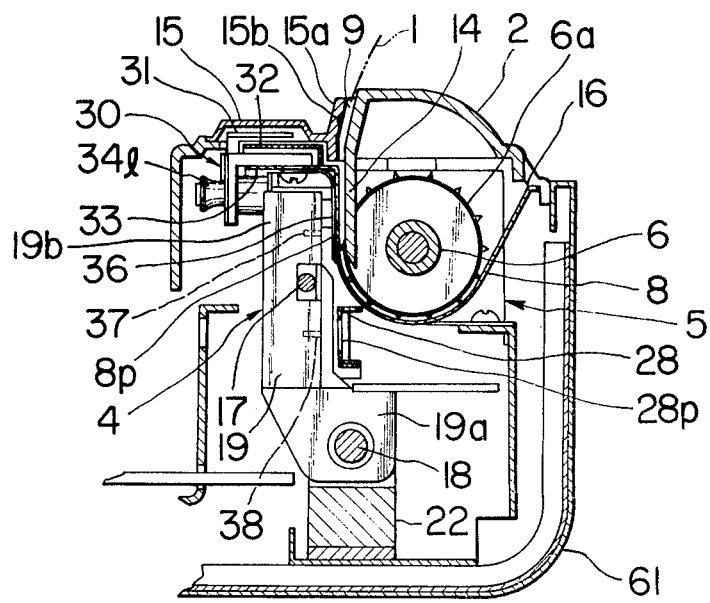
FIG. 4 is a sectional view showing additional construction details for the reading apparatus.

Referring to FIGS. 2-4, the reading device 3 is mounted on the machine body 61, including a frame 5 (actually comprising several elements) disposed under the cover 2. A shaft 7 having a feed roller 6 affixed thereto which includes a pair of sprocket wheels 6a for feeding the program card 1 in one or the other direction in cooperation with a pair of rows of perforations 1a and 1b formed in the card 1 is rotatably mounted in the frame 5. As shown in FIG. 3, four discs 6b are also provided on the feed roller 6 between the sprockets 6a for holding the program card 1 in a semicylindrical state.

A guide plate 8 in FIG. 4 having a nearly U-shaped cross-section is mounted on the frame 5 for allowing contact of the program card 1 with the feed roller 6 for guiding the program card 1 from an elongated front opening or entrance slot 9 defined by the cover 2 and an upper plate 15 mounted on the cover 2 to another elongated rear opening or exit slot 16 formed between the cover 2 and the machine body 61 while the program card 1 passes over a scanning line of a scanning sensor 37 and further passes through the under face of the feed roller 6 along the lower circular portions of the discs 6b of the feed roller 6, or vice versa. The cover 2 is provided with five vertical hanging portions 14 of FIG. 4 between each sprocket wheel 6a and an adjacent disc 6b and also between the adjacent discs 6b for holding the card 1 inserted from the entrance slot 9 against the rear (right hand side in FIG. 4) face thereof to support it in a flattened state along the scanning line. The upper plate 15 is provided in the rear (right hand side in FIG. 4) side thereof with an upright portion 15a extending alongside the entrance slot 9. The upper plate 15 is made of a transparent material such as a transparent plastic material to allow direct observation of the program card 1 inserted from the entrance 9 through the upright portion 15a of the upper plate 15. A colored reference line 15b in FIG. 4 is provided on the upright portion 15a for appropriate positioning of the program card 1.

The feed roller 6 is adapted to be incrementally rotated in one or the other direction by means of a bidirectional stepping motor 12 cooperating through a gearing connection comprising a gear 10 and another gear (not shown) which are mounted on the shaft 7 of the feed roller 6 and the output of the stepping motor 12, respectively, and the stepping motor 12 is mounted on the frame 5.

A thumb wheel 13 is exposed to the exterior of the machine through a window of the cover 2. Wheel 13 is mounted on the shaft 7 of the feed roller 6 to permit the manual operator to manually incrementally feed the card 1.

The program card 1 in FIG. 2 together with the reading means is used to instruct or program the circuit means, which may include a microcomputer means, to control the manner in which fabric is knitted. As shown in FIG. 2, the card 1 includes, between a pair of rows of perforations 1a and 1b, mutually perpendicular lines which define a design area 1p of rectangles which extend in columns and rows. The rectangles in the design area 1p correspond to stitches and the columns and rows to wales and courses, respectively, which may be knitted in a fabric in accordance with instructions on the card. Preferably the width and height of each rectangle is such as to substantially correspond to the width and height of a typical stitch.

The card 1 further includes, between the design area 1p and the right-hand side row of perforations 1b, a function area 1f which involves one independent and two paired columns of rectangles aligned with the rows of rectangles in the design area 1p. In a preferred embodiment the columns in the function area 1f are provided for operation of the output elements of the circuit means. For example, the independent column controls the action of an alarm device and one pair of the columns relates to the designation of the feeding direction of the program card 1 itself. One column of the other pair relates to successive feeding or jumping of the card 1 and the other column relates to stopping in such successive feeding. The alarm device may be employed by the machine operator, for example, for detecting the instant when a given knitting yarn 65 is changed to another knitting yarn having a different color.

The reading device 3 further includes a reading head or a scanning member 4 which is slidably mounted on a pair of upper and lower guide rods 17 and 18 mounted on the frame 5 in parallel with the shaft 7 of the feed roller 6.

A transverse slot provided in lower base portion 19a of a running body 19 of the scanning member 4 is slidably met with the upper guide rod 17, while a bobbin 20 affixed to the base portion 19a is slidably met with the lower guide rod 18. A coil 21 is wound around the bobbin 20. Disposed in a position below the lower guide rod 18 and fixedly mounted on the frame 5 in parallel with the guide rod 18, is an elongated permanent magnet 22 constituting a linear motor cooperative with the coil 21. Different magnetic poles are provided for the upper and lower portions of the permanent magnet 22. The lower guide rod 18 and at least part of the frame 5 are preferably made of a suitable magnetic material to form the desired magnetic path. During operation, the application of current to the coil 21 causes the scanning member 4 to be moved along the length of the guide rods 17 and 18 in response to the direction of the current flowing through the coil 21.

The scanning member 4 is normally positioned at the left stroke end in the position shown in FIG. 2, and is moved from the left to the right stroke end and subsequently returned to the original left stroke end from the right. The reciprocating movement of the scanning member 44 is typically accomplished in a continuous cycle without any dwelling.

Figure 5:
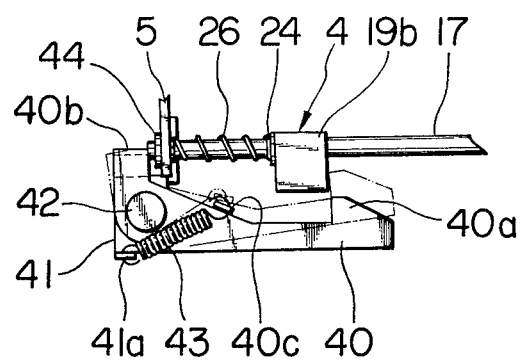
FIG. 5 is a partial plan view of the reading apparatus showing a rebound preventing device according to the invention.

The right stroke end is defined by a stop 23 which is attached to the frame 5 and disposed to be contacted by the right-hand side face of the base portion 19a of the running body 19 while the left stroke end is defined by an abuttment member or stop 24 which is attached to the upper guide rod 17 and disposed to be abutted by the left-hand side face of the upper portion 19b of the body 19, as shown in FIG. 2. The guide rod 17 is arranged to be movable axially or longitudinally relative to the frame 5 and urged by a spring buffer 26 rightwardly as viewed in FIG. 2. The rightward movement of the rod 17 is restricted by engagement with the frame 5 of a stop 44 suitably provided on the rod 17 as shown in FIG. 5. The stops 24 and 44 may be made each in the form of a conventional snap ring. The guide rod 17 is operatively associated with a rebound preventing device as hereinafter described.

A photoelectronical sensor 37 including a light emitting element and a photoelectric transducer to convert the light reflected from the surface of the program card 1 to an electric signal is disposed at a rear (right as viewed in FIG. 4) side of the upper portion 19b of the body 19. The sensor 37, hereinafter referred to as the "scanning sensor", is adapted to scan the program card 1 along the predetermined scanning line.

In order to properly expose the program card 1 on the feed roller 6 to the scanning sensor 37, the card guide plate 8 is provided along the scanning line of the scanning sensor 37 with slits 8p which correspond to the columns in the design area 1p of the program card and also with slits 8f which correspond to the columns in the function area 1f. The slits 8p and 8f of FIG. 2 could also be formed as one or several elongated holes.

In order to enable the scanning sensor 37 to read an unmarked portion of the program carrier 1 at the start of a scan by the scanning member 4, the card guide plate 8 is formed with a further slit 8n which is disposed at the left of and in line with the row of slits 8p and 8f so that the scanning sensor 37 in the original portion can read the blank or unmarked area specially provided at the left outside of the design area 1p on the program carrier 1. The reflectivity of light at an unmarked portion of the program carrier 1 is stored in a memory in the circuit means in the form of an electrical digital signal and is utilized as a reference in a subsequent comparison with the reading by the scanning sensor 37 of a row of instructions on the carrier 1 in alignment with the unmarked portion to determine whether each instruction read is a "mark" or not.

A horizontally extending linear encoder 28 in the form of an elongated plate is mounted on the frame 5 in parallel with the guide rods 17 and 18 in a position below the scanning line in the rear (right as viewed in FIG. 4) side of the scanning member 4. The linear encoder 28 has slits 28p and 28f formed thereon corresponding, respectively, to the columns in the design area 1p and function are 1f on the program card 1. It is to be understood that the width of each of the slits 28f and 28p is formed less than the width of the corresponding slits 8f and 8p provided in the card guide plate 8.

A similar photoelectronic sensor 38, also including a light emitting element and a photoelectric transducer, is mounted on the upper portion 19b of the body 19 for photoelectronically reading the slits 28p and 28f of the linear encoder 28. The sensor 38, hereinafter referred to as the scanner 4 is actuated to return to the original leftmost position. Circuit means are also provided to detect whether the scanner 4 has been caused to stop due, for example, to binding during a scan. This is achieved with a timer counter for determining the time interval between two successive strobe pulses provided by the strobe sensor 38. If the time interval reaches or exceeds a predetermined length of time, the circuit means detects that difficulty, such as binding, has been encountered by the reading device 3. In such a case the scanner 4 is then actuated to its original starting position.

Marks in the design area 1p of the program card 1 define the pattern to be knitted. Marks in the function area 1f may also define a pattern to be knitted such as providing for vertical repeat imaging or a vertical mirror repeat imaging of a unit design. The boundaries for a unit design area to be repetitively reproduced in a fabric must be selected or specified by the machine operator, and the boundaries in the vertical or feeding direction of the program card 1 will be specified by selectively darkening rectangles in one or both of the pairs of the columns in the function area 1f while the boundaries in the horizontal direction will be specified by means of a size delineating means which will be described in detail.

Referring now to FIGS. 2-4, an extension 33 extending horizontally and adjacent to the upper plate 15 is formed in the front left (as viewed in FIG. 4) portion of the guide plate 8. Notches are formed in the extension 33 corresponding to the slits 8p and an elongated hole disposed in parallel with the scanning line in the intermediate position of the extension 33.

A movable defining member designated generally by the numeral 30 is slidably mounted on the extension 33, and includes a body comprising a horizontal portion and vertical portion. A spacer engaged in the elongated hole to guide the movable head 30 along the hole, and a metallic reflective plate 36 disposed in the opposite side of the extension 33 for restraining the vertical movement of the head 30 are fastened in a lamination by a set screw on the horizontal portion of the body. A hole is provided in the vertical portion of the body to provide for mounting a detent roller for engagement with a notched portion of the extension 33. The detent roller is urged against the notched portion of the extension 33 by a leaf spring fixed to the front of the vertical portion.

A manually operable thumb wheel 29 is rotatably mounted on the frame 5 in the vicinity of the right end of the extension 33 for moving the defining member 30 along the length of the knitting machine. The upper portion of the thumb wheel 29 is exposed to the exterior through a window opening formed in the cover 2. The thumb wheel 29 has a pulley 34r integral therewith. A cord 35 connected to said defining member 30 is extended between the pulley 34r and another pulley 34l rotatably mounted on the frame 5 in the vicinity of the left end of the extension 33. The cord 35 has one end fixedly connected to the member 30 and the other end connected to one end of a takeup coil spring. The other end of the spring is connected to the member 30. In order to permit movement of the movable head 30 to the right or left direction as viewed in FIG. 2 or 3 as the wheel 29 is manually rotated, the cord 35 is wound in several rolls around the pulley 34r and the tension of the coil spring is chosen so that spring provides sufficient friction between the pulley 34r and the cord 35 to move the defining member 30 in response to manual rotation of the wheel 29.

The reflective plate 36 mounted on the defining member 30 has a vertical portion extending downwardly beyond the slits 8p on the guide plate 8 and is disposed adjacent to said guide plate 8. The surface of the vertical portion (the left hand side surface as viewed in FIG.

4) is formed as a mirror to enhance the reflection of the light. The vertical portion has a width sufficient to cover or shut one slit 8p on the card guide plate 8.

A scale 32 having graduations aligned with the columns in the design area 1p of the program card 1 and several numbers indicative of the numerals corresponding to the number of columns numbered from the leftmost column as viewed in FIG. 2 is disposed between the upper plate 15 and extension 33. The defining member 30 includes a pointer 31 for indicating the graduation on the scale 32. With this arrangement, the indicator including the pointer 31 and scale 32 indicates the column in the design area 1p on the program card 1 corresponding to the slit 8p on the guide plate 8 covered by the reflective plate 36.

The design column on the card 1 indicated by the indicator is used to specify the right hand boundary column while the left hand boundary column is always specified by the leftmost design column of the card 1. Accordingly, the size of the desired unit design in the horizontal direction is specified by the number of the columns included between the left and right hand boundary columns inclusive, the number being indicated by the indicator means as described above. As a result of this arrangement, the size of the unit design in the horizontal direction may be specified and selected by manual operation of the thumb wheel 29 by the machine operator.

As previously mentioned, the front face of the reflective plate 36 is formed as a mirror having a relatively high reflectivity factor for light as compared with either the front face of the guide plate 8 which is typically colored in black for minimizing reflection of light or the surface of the card 1. Due to this arrangement the output voltage from the scanning sensor 37 is rapidly raised, when the scanning sensor 37 comes to a position opposed to the reflective plate 36, to a level considerably higher than the output voltage otherwise resulting when reading a marked or unmarked instruction on the program carrier. A comparator means is provided for comparing the output of the scanning sensor 37 with an appropriate reference voltage to detect when the sensor 37 is in a position opposed to the reflective plate 36. The appropriate reference voltage may be readily determined by experiment and has a level intermediate between the aforementioned level and any other highest level when the sensor 37 reads other than the reflective plate 36.

The output of the strobe sensor 38 is connected to a similar comparator, the output pulses of which are sequentially counted by a counter provided in the circuit means from the start of a scan by the scanning member 4. The counter is typically cleared immediately prior to the start of a count.

The counting operation of the counter is suspended from counting when a low voltage as mentioned above is supplied from the first mentioned comparator, and such counting value is stored in a memory included in the circuit means. Thus, the currently valid needle selecting unit number may be stored in the memory in the form of an electric digital signal by controlling the pointer 31 based on the scales on the dial 32 by turning the thumb wheel 29 as described above.

The control circuit includes a memory for storing the binary signals derived from reading the knitting pattern, and the electric binary signals stored in the memory may be appropriately read out to cause needle selection by a needle selecting device including the previously described electromechanical actuators as the carriage 63 traverses the needle bed.

With such arrangement of the reading apparatus 3, a scan is started at a suitable point in time when the carriage is positioned outside the range defined by a pair of actuator members 68 placed on the needle bed 2. Such a point in time may be, for example, at an instant when the carriage has just passed the actuator members 68 on the needle bed for given direction of the carriage travel and is then outside the range defined by the actuator members 68.

During scanning, the scanning sensor 37 reads first at the start of the scan an unmarked portion of the program card 1 and thereafter the row of instructions in the design and function areas 1p and 1f aligned with the unmarked portion while the strobe sensor 38 reads the linear encoder 28 to produce strobe pulses corresponding to the slits 28p and 28f for sampling the output of the scanning sensor 37. Presetting of the needle selecting unit number is effected in the circuit means based upon detection of the reflective plate 36 by the scanning sensor 37. When the scanning member 4 arrives at the right stroke end, which event is detected based upon the count of the output strobe pulses from the strobe sensor 38 corresponding to the total number of the slits 28p and 28f of the linear encoder 28, the scanning member 4 is then typically immediately actuated to move leftwardly to return to its starting position. During the return stroke the readings by the sensor 37 are disregarded by the circuit means.

The program reading apparatus as described above is similar, structurally and functionally to apparatus disclosed in U.S. patent application Ser. No. 799,279, titled "Method and Apparatus for Providing Patterning Instructions in a Knitting Machine", filed on May 23, 1977, now U.S. Pat. No. 4,078,401. The program reading apparatus of the present invention is additionally provided with a rebound preventing device for preventing rebound of the reading head or scanning member upon arrival at or return to the starting position.

The rebound preventing device according to the present invention will now be described in detail. The energization of the linear motor is maintained for a predetermined period of time during the return movement of the scanning member 4 to urge or actuate the scanning member 4 leftwardly towards its starting position. The linear motor is then deenergized until the next subsequent scan cycle is started. In order to assure proper positioning of the scanning member 4 at its starting position, the scanning member 4 is momentarily arrested by the rebound preventing device which causes the member 4 to stop at the proper starting position.

Referring to FIGS. 2, 3 and 5, the rebound preventing device includes an arrester lever 40 mounted for pivotal movement in a horizontal plane about a pivot 42 disposed in front of and spaced apart from the upper guide rod 17. The pivot 42 is mounted on a support bracket 41 which is fastened to the frame 5 by a fastening screw. The lever 40 includes an arm extending rearwardly and having at the end thereof a bent portion 40b in alignment with the rod 17. A tension coil spring 43 is stretched between lugs 40c and 41a formed on the lever 40 and the bracket 41, respectively, and urges the lever 40 clockwise as viewed in FIG. 5 so that the bent portion 40b of the lever 40 is engaged with the left end face of the rod 17. Thus, leftward movement of the rod 17 pivots the arrester lever 40 anticlockwise about the pivot 42 against the force provided by the tension spring 43.

The arrester lever 40 further includes another longer arm extending substantially in parallel with the guide rod 17 to the right beyond the abutment member 24 on the rod 17 and having a hook 40a formed on the rear side of the free end thereof. The lever 40 is usually positioned in an inoperative position in which the hook 40a thereof is clear of the reading head or scanning member 4 as indicated by the solid line in FIG. 5. The lever 40 is pivotable to an operative position in which said hook 40a is engageable with the upper portion 19b of the scanning member 4 as indicated by the (dashed) phantom line in FIG. 5 to thereby prevent the scanning member 4 from moving either to or from its leftmost starting position.

The rebound preventing device further includes the upper guide rod 17, the abutment member 24 thereon, and the spring buffer 26 which operate in response to arrival or return of the scanning member 4 at the starting position. When this occurs, the arrester member 40 momentarily arrests the scanning member 4 at its starting position as will be further described. In operation, the scanning member 4 comes into colliding contact with the abutment member 24 on the upper guide rod 17 at the end of its return movement to its starting position. When such colliding contact occurs, part of the momentum of the reading head 4 is transmitted through the abutment member 24 and guide rod 17 to the arrester lever 40 to actuate and causes the lever 40 to be pivoted anticlockwise about the pivot 42. As a result of this momentum transfer, arrester lever 40 is pivoted, in part, by its own inertia against the force provided by the spring 43 until it reaches the operative position in which the hook 40a of the lever 40 is positioned adjacent to the right-hand side face of the upper portion 19b of the body 19 of the scanning member 4. At the same time that the arrester lever 40 is undergoing this pivotal movement, the reading head 4 is also moving, at first, continuously for a short distance to the left beyond its starting position, thereby also moving the abutment member 24 to the left along the guide rod 17 and causing the buffer spring 26 to be correspondingly compressed. Thereafter, the force of the compressed spring buffer 26 causes the reading member 4 to be moved back to the right until the right-hand side face of the upper portion 19b of the reading member 4 engages with the hook 40a of the arrester lever 40 which is in the operative position. As a result of this arrangement, the reading head 4 is arrested at its starting position. The arrester lever 40 is next automatically pivoted clockwise by the spring 43 back to the original inoperative position, thereby freeing the reading head 4 from engagement with the lever 40. Thus, the reading head 4 is temporarily arrested at its starting position by the arrester lever 40 of the rebound preventing device, and remains at the starting position thereof until further actuated or driven for another scanning cycle.

The spring buffer 26 is selected to have an appropriate strength to permit the reading head 4 to move beyond the starting position for a short specified distance, for example, one millimeter, when it first arrives at or returns to the starting position with a predetermined standard or typical speed. The spring 43, on the other hand, is selected to have an appropriate strength to permit the arrester lever 40, to be pivoted to the operative position by the momentum transferred to it from the reading head 4 and, thereafter, returned to the original inoperative position.

In an alternative arrangement, the spring 43 could be utilized to perform the function of the spring 26 by, for example, a suitable arrangement of the rod 17, head 4 and/or lever 40, for example, by mounting on the rod 17 another stop restricting the leftward movement of the rod 17 within a short distance.

It is to be understood that the rebound device according to the present invention is advantageous in that it operates reliably and positively, regardless of the precise speed of the reading head within the normal range of speeds upon arrival at or return of the reading head to the starting position.

The program reading device 3 according to the present invention further includes additional means to improve the speed with which a scanning cycle may be effected. Referring to FIG. 2, such means includes a permanent magnet 45 attached to a support 46 fastened to the frame 5 by a fastening screw such as the fastening screw for the support bracket 41. A pair of permanent magnets 47 and 48 are mounted at the left and right ends, respectively, of the top of the base portion 19a of the running body 19. The left magnet 47 is then disposed to be aligned with the magnet 45 when the reading head 4 is in the starting position as shown in FIG. 2. The magnet 45 is positioned so that its poles correspond appropriately to those of the magnet 22 for the linear motor. For example, if the north pole of magnet 22 is directed to the top, the magnet 45 also has its north pole directed to the top. The magnets 47 and 48, on the other hand, have inverted polarities relative to polarities of the magnets 22 and 45 so that the scanning member 4 is urged upwardly by the repulsive force between the magnet 22 and the magnets 47 and 48.

In the starting position of the scanning member 4, the repulsive force between the magnets 45 and 47 has no horizontal component and the scanning member is urged downwardly. But when the magnets 45 and 47 are not aligned with one another, the horizontal component of the force therebetween tends to urge the scanning member 4 rightwardly, away from the starting position. As a result, the scanning member 4 is additionally accelerated by that component of the repulsive force at the start of a scanning cycle and it is decelerated by the same force upon return of the scanning member 4. Because of this arrangement, the rapidity with which a scanning cycle can be effected is thus considerably improved.

What is claimed is:

1. In a program reading apparatus having a movable reading head which is mounted for movement from and to a starting position along a path, the improvement comprising:

an arrester member having a first position in which it is clear of the reading head and being movable to a second position in which it is engageable with the reading head to prevent movement of the reading head from the starting position;

means for urging the arrester member from the second position to the first position; and means responsive to the arrival of the reading head at the starting position for momentarily actuating the arrester member to move said arrester member to the second position so that said arrester member momentarily arrests the reading head from rebounding movement from the starting position.

2. The improvement as claimed in claim 1 wherein said responsive means includes an abutment member mounted for limited movement from a normal position and disposed to be abutted and moved from the normal position by the reading head during movement of the reading head to the starting position and a spring buffer means for urging said abutment member to the normal position.

3. The improvement as claimed in claim 1 wherein the responsive means includes a guide rod for guiding the reading head along the path, an abutment member disposed on the guide rod and having a normal position and adapted to be abutted by the reading head during movement of the reading head to the starting position, said guide rod being mounted to allow limited axial movement with said abutment member from the normal position, and a spring buffer for urging said abutment member and said guide rod to the normal position, said guide rod being operatively associated with said arrester member to momentarily actuate said arrester member when the reading head abuts the abutment member.

4. The improvement as claimed in claim 1 wherein said responsive means includes an abutment member mounted for limited movement from a normal position and disposed to be abutted by and moved from the normal position by the reading head during movement of the reading head to the starting position; and said urging means also urges said abutment member to the normal position.

5. The improvement as claimed in claim 1 wherein said arrester member comprises a lever mounted for pivotal movement about an axis and operatively associated with said responsive means and adapted to be momentarily pivoted by said responsive means when the reading head arrives at the starting position.

6. The improvement as claimed in claim 5 wherein said lever is arranged substantially in parallel with the path and includes a hooked portion which intersects the path to engage with the reading head to arrest the reading head at the starting position when said lever is in the second position.

7. The improvement as claimed in claim 5 wherein said lever includes a major arm for engagement with the reading head to arrest the reading head; said responsive means includes an abutment member having a normal position and disposed to be abutted and moved from the normal position by the reading head during movement of the reading head to the starting position and a spring buffer for urging said abutment member to the normal position; and said lever includes a minor arm adapted to be operated by said abutment member upon abutment of said abutment member by said reading head.

8. The improvement as claimed in claim 7 wherein said urging means provides an urging force permitting said lever to be pivoted to the second position when the reading head arrives at the starting position with a predetermined speed.

9. The improvement as claimed in claim 1 further comprising magnetic means providing a force tending to accelerate the reading head when the reading head moves from the starting position and to decelerate the reading head when the reading head moves to the starting position, said magnetic means providing substantially no force tending to move the reading head when the reading head is in the starting position.

10. The improvement as claimed in claim 9 wherein said magnetic means includes a pair of magnets, one of said magnets being mounted on the reading head.

11. In a program reading apparatus having a movable reading head which is mounted for movement from and to a starting position along a path, the improvement comprising:
an arrester lever mounted for horizontal pivotal movement to an operative position in which it is engageable with the reading head to prevent movement of the reading head from the starting position;
a spring means for urging said arrester lever from the operative position; and
means for imparting to said arrester lever part of the momentum of the reading head upon arrival of the reading head at the starting position to pivot said arrester lever towards the operative position against the urging of said spring, said spring having an appropriate strength to permit the arrester lever to be pivoted by its own inertia to the operative position upon receiving momentum transferred from the reading head arriving at the starting position with a predetermined speed.

12. The improvement as claimed in claim 11 wherein said imparting means includes an abutment member having a normal position and disposed to be abutted by and moved from the normal position by the reading head upon arrival of the reading head at the starting position; said arrester lever having an arm operatively engaged with the abutment member; and comprising a spring buffer for urging said abutment member to the normal position.

13. In a program reading apparatus having a movable reading head which is mounted for movement from and to a starting position along a path, the improvement comprising:
a first permanent magnet mounted on a stationary portion of the apparatus;
a second permanent magnet mounted on the reading head in a position for alignment with said first magnet when the reading head is in the starting position, said first and second magnets being disposed to provide repulsive force therebetween so that the reading head is accelerated and decelerated by the repulsive force upon movement of the reading head from and to the starting position, respectively.

* * * * *